United States Patent [19]

Burckhardt et al.

[11] 3,797,893
[45] Mar. 19, 1974

[54] BRAKE FORCE CONTROL SYSTEM FOR VEHICLES

[75] Inventors: Manfred H. Burckhardt, Waiblingen; Hellmut Krohn, Esslingen, both of Germany

[73] Assignee: Daimler-Benz Aktiengesellschaft, Stuttgart-Unterturkheim, Germany

[22] Filed: July 6, 1972

[21] Appl. No.: 269,433

[30] Foreign Application Priority Data
July 6, 1971   Germany.......................... 2133547

[52] U.S. Cl. .......... 303/21 BE, 303/20, 303/21 AF
[51] Int. Cl. ............................. B60t 8/08, B60t 8/12
[58] Field of Search ................. 188/181; 303/20, 21; 324/161–162; 340/52 B, 262–263; 180/82 R, 103, 104

[56] References Cited
UNITED STATES PATENTS

| 3,672,730 | 6/1972 | Burckhardt et al. .......... 303/21 P X |
|---|---|---|
| 3,652,132 | 3/1972 | Ando et al. .................... 303/21 CG |
| 3,260,555 | 7/1966 | Packer ............................ 303/21 EB |
| 3,606,492 | 9/1971 | Hayes ............................. 303/21 EB |
| 3,620,577 | 11/1971 | Neisch et al. ................... 303/21 EB |
| 3,275,384 | 9/1966 | Hirzel ............................ 303/21 CG |

Primary Examiner—George E. A. Halvosa
Assistant Examiner—Stephen G. Kunin
Attorney, Agent, or Firm—Craig and Antonelli

[57] ABSTRACT

A brake force control system for vehicles, especially for motor vehicles, in which a sensor is coordinated to each wheel for determining its rotational condition, whose signals actuate inlet and outlet valves when exceeding or dropping below certain threshold values so that the brake pressure either increases, remains constant, or decreases, whereby, particularly in vehicles with a high center of gravity and especially with a short wheel base, an additional logic circuit connection is provided which decreases the pressure at the front wheel brakes if a signal symbolizing the road traction of the rear wheels does not arrive within a certain delay.

44 Claims, 3 Drawing Figures

BRAKE FORCE CONTROL SYSTEM FOR VEHICLES

The present invention relates to a brake force control system for vehicles, especially for motor vehicles, whereby a sensor or detecting device is coordinated to each wheel for detecting its rotational condition, whose signals actuate, when exceeding or falling below certain threshold values, inlet and outlet valves so that the brake pressure either increases, remains constant or decreases. In particular, though not exclusively, the present invention is of significance for a brake force control system according to the German Patent Application P 19 37 123.4-21, to which corresponds the U.S. application Ser. No. 52,833, now U.S. Pat. No. 3,744,851, assigned to the assignee of the instant application, and the subject matter of which is incorporated herein by reference to the extent necessary. The application of the present invention is of importance in particular for commercial types of vehicles, such as trucks, especially when these vehicles additionally have a short wheel base. is The application of brake force control systems in commercial types of vehicles such as trucks with a high center of gravity encounters considerable difficulties The brakes of a commercial-type vehicle such as a truck must be so matched that the vehicle in the fully loaded condition can be braked sufficiently rapidly and with acceptable pedal forces. If one fulfills this requirement, then there always exists the danger especially in vehicles with high center of gravity and short wheel base that they are overbraked in the unloaded condition and under certain circumstances tilt forwardly, i.e., therefore in the worst case also make a headstand. This danger becomes particlarly great because the front wheels can transmit particularly large brake forces due to the brake force control system.

The present invention is now concerned with the task to avoid the described disadvantages. The present invention is intended to demonstrate an approach as to how a brake force control system can be constructed in order to preclude a tilting or forward pitching of the vehicle and to this preclude the headstand connected therewith under certain circumstances.

If the vehicle seeks to make a headstand, initially the rear wheels are unloaded and then lift off. They are therefore no longer in the position to transmit any forces to the road surfaces or to absorb any forces from the road surface. This leads to a rapid rotational speed decrease of the rear wheels also when the brake pressure is decreased to zero by the brake force control system as a result of the locking tendency. Particularly, no reacceleration of the wheels up to the driving velocity occurs since such a reacceleration is possibly only by the transmission of tangential forces from the road surface to the tires.

If the front wheel brakes are not disengaged in the described condition, the vehicle tilts forward ever more until finally it stands on its head. Though this action requires a considerable amount of time, it does not, however, require so much time that the normal driver could react correctly.

A brake force control system now offers the possibility to detect this condition by appropriate measurement techniques. More particularly, during this condition no reacceleration signal occurs at the rear wheels. A similar condition may also occur, for example, during the transition from a gripping road, i.e., a road offering traction onto smooth ice as long as the brake pressure has not been sufficiently decreased by the control system. Even in this last-mentioned case, however, this condition only occurs for short periods of time (for example, for about 100 ms.). If therefore no reacceleration of the rear wheels is indicated by the control system after a somewhat longer period of time, for example, after 200 to 300 ms., then this is a sure sign that the rear axle has lifted off the ground. If now a further tilting of the vehicle up to the headstand is to be avoided, then in this case the brake pressure at the front wheels has to be decreased, and more particularly to such an extent until as a result of renewed road contact, the rear wheels supply a reacceleration signal. Thereafter at first the front wheel brake pressure is kept until the slippage threshold or reacceleration threshold of the used brake force control system is dropped below at the rear wheels. Thereafter, the further decrease of the front wheel and rear wheel brake pressures takes place in the usual manner.

Accordingly, the present invention is concerned with the general concept that with a brake force control system for vehicles having a high center of gravity and especially a short wheel base, an additional logic circuit connection is provided which decreases the pressure at the front wheel brakes if within a predetermined delay a signal symbolizing the ground adherence of the rear wheels does not occur.

It is possible in this manner to detect the tendency of tilting already early and to prevent by timely countermeasures the tilting itself and above all the headstand.

In detail, it is proposed according to the present invention for a brake force control system with a pure acceleration control or with a combined acceleration-slippage control of any known construction that by means of the additional logic circuit connection, the pressure at the front wheel brakes is lowered if after a delay of about 200 to 300 ms. —beginning after the expiration of the filter time following a pressure decrease signal at the rear wheels—no reacceleration signal occurs at the rear wheels. For a brake force control system with a conventional pure slippage control or with a conventional slippage guidance of the rear wheels, the present invention proposes that by means of the additional logic circuit connection, the pressure is decreased at the front wheel brakes if after a delay of about 100 to 200 ms. —beginning with the pressure decrease signal upon exceeding the upper slippage threshold of the rear wheels—no signal occurs indicating a dropping below a slippage threshold at the rear wheels.

In vehicles with a very low moment of inertia about the cross axis, the indicated delay of about 200 to 300 ms. is under certain circumstances somewhat long. It may be appropriate in such cases to interact as a precautionary measure already in the normal control before the rear wheels have lifted off unequivocally. This can be realized according to a further embodiment of the present inventive concept in such a manner that in the presence of pressure decrease signals at both rear wheels, the pressure build-up signals of the normal control are stopped at the front wheels whereas the pressure decrease signals are permitted to pass without obstruction, i.e., unimpairedly. As a result thereof, a further increase of the prevailing pressure at the front wheel brakes is prevented during the duration of the pressure decrease signals at the rear wheels.

Depending on the vehicle type, it may be correct to actuate the control influence already by one rear wheel or only by both rear wheels, i.e., according to the present invention, the additional logic circuit connection responds already to the signal of one rear wheel or only to the signals of both rear wheels. In particular, during braking while driving through curves, the influencing by only one rear wheel may be of advantage.

It is thereby additionally within the scope of the present invention if the pressure decrease at the front wheel brakes takes place intermittently, i.e., therefore by a so-called "pulsing" of conventional nature utilizing a sequence of pulses to cause the pressure decrease.

Accordingly, it is an object of the present invention to provide a brake force control system for vehicles, particularly for motor vehicles which avoids by simple means the aforementioned shortcomings and drawbacks encountered in the prior art.

Another object of the present invention resides in a brake force control system for commercial-types of vehicles, especially for trucks with relatively high center of gravity and small wheel base which effectively minimizes the danger of forward tilting of the vehicle, particularly in the unloaded condition.

A still further object of the present invention resides in a brake force control system for vehicles of the aforedescribed type which effectively prevents the danger that the vehicle will make a headstand due to excessively rapid braking in the unloaded condition.

Still another object of the present invention resides in a brake force control system which achieves the aforementioned aims and objects by simple means utilizing conventional, commercially available logic circuit elements.

Another object of the present invention resides in a brake force control system for vehicles which can be readily installed with the presently known brake force control systems without involving complicated redesigns thereof.

These and further objects, features, and advantages of the present invention will become more apparent from the following description when taken in connection with the accompanying drawing which shows, for purposes of illustration only, several embodiments in accordance with the present invention, and wherein.

Figure 1:
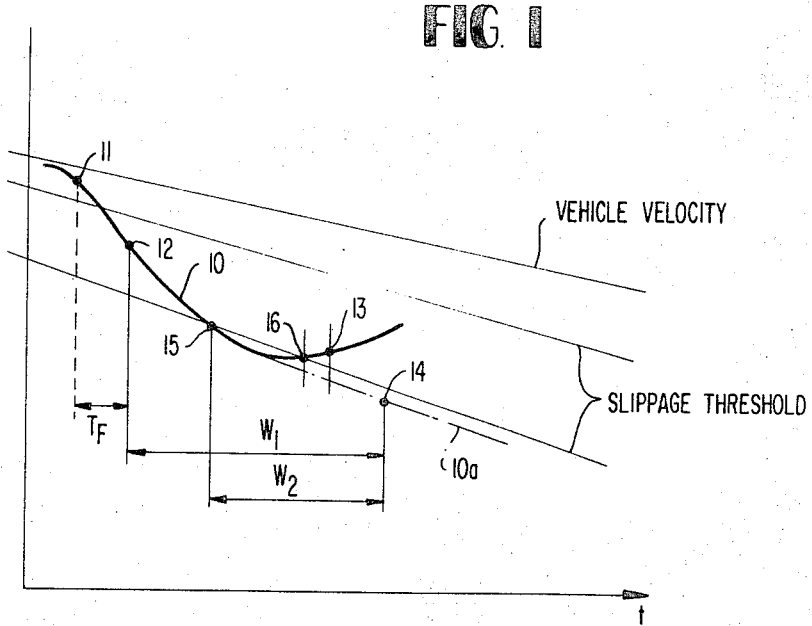
FIG. 1 is a diagram illustrating the general concept of the operation of a brake-force control system in accordance with the present invention.

Referring now at first to the diagram of FIG. 1, the wheel velocity during a normal braking operation with a brake-force control progresses corresponding to the full-time curve 10. With a pure acceleration control or with a combined acceleration-slippage control, the acceleration threshold of the brake-force control system is now exceeded, for example, at point 11 and after expiration of the filtering time TF—by means of which interference signals or interference pulses are eliminated—the pressure decrease at the rear wheels begins at point 12. A delay period $W_1$ also begins at this point 12, which may amount to about 200 to 300 ms.

If now the rear wheels retain their ground adherence, i.e., their traction, then they are reaccelerated by the road surface as a result of the pressure decrease at the brakes and, for example, at point 13, the reacceleration signal is produced. This reacceleration signal from a time point of view therefore lies within the delay period $W_1$, i.e., in other words, the rear wheels have maintained their ground traction and there is no danger of a tilting in the forward direction. The control can therefore proceed in the normal, usual manner.

If, however, the rear wheels have now lifted off the ground, then a reacceleration does not occur. In this case, the wheel velocity does not progress or proceed in its second portion according to the full-line curve 10 but progresses according to the curve 10a illustrated in dash and dot lines. In that case, therefore, no reacceleration of the rear wheels occurs, i.e., also no corresponding reacceleration signal will arrive within the delay period $W_1$. Consequently, at the end of this delay period, i.e., directly at point 14 or shortly thereafter, the pressure at the front wheel brakes is decreased by the control system.

With a pure slippage control or a pure slippage guidance of the rear wheels, the control proceeds in principle exactly as described above. However, the delay period $W_2$ begins only at point 15, i.e., with the pressure decrease signal upon exceeding the upper slippage threshold of the rear wheels. If the rear wheels now maintain their ground adherence or traction, then the wheel is reaccelerated and at point 16, i.e., within the delay period $W_2$, this slippage threshold is already dropped below again. However, if such a dropping below does not occur—because in particular the rear wheels have lifted off—then after the lapse of the delay period $W_2$, the pressure at the front wheel brakes is again decreased at point 14 or directly thereafter.

Figure 2:
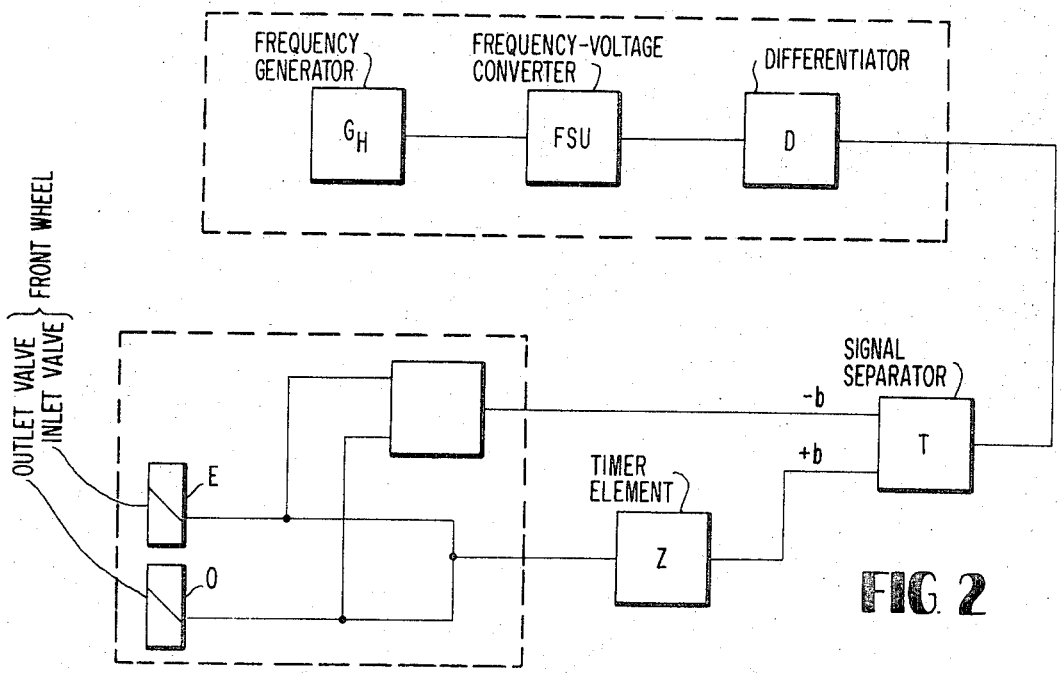
FIG. 2 is a schematic block diagram illustrating the principle of a control system in accordance with the present invention.

Referring now to FIG. 2, this figure illustrates schematically the principle of a control diagram in accordance with the present invention, in which the rotational condition is detected at the rear wheels, as well as at all other wheels, by a respective frequency generator $G_H$ of conventional construction, of which one is associated with each wheel or at least with each axle, the output of which is fed to a frequency—voltage converter FSU to produce in the output of the latter a voltage proportional to rotational speed. This rotational speed-proportional voltage is then fed to a differentiator D of conventional construction so that one obtains in the output thereof the differential of this voltage, such as the acceleration signals. The parts of FIG. 2 described so far are analogous to corresponding parts of the system described in the aforementioned co-pening application and are therefore surrounded by a dash line. Differing from the system disclosed in the prior applications, a signal separator T of conventional construction, is connected to the output of the differentiator D so as to produce in its two output signals of different signs and thus to separate the differential signals (acceleration signals), according to their signs, i.e., whether they are positive or negative. The negative acceleration signals $(-b)$ are further processed in the usual manner, as disclosed for example in said copending applications to control the valves such as inlet and outlet valves of the hydraulic brake system associated with the respective wheel. The positive acceleration signal (+b), in turn, is fed to a timer element Z also of conventional construction. This timer element is adjusted to a predetermined time delay and is additionally connected with a negation element of conventional construction. The timer element Z is so constructed and combined with the negation element, utilizing conventional logic circuits, that a pulse will always be produced in the output of the timer element Z when the positive acceleration signal (+b) is not present in its input after the adjusted time delay. The pulse produced in the output of the timing element Z then controls the inlet valve E and simultaneously the outlet valve O in such a manner that the inlet valve is closed and the outlet valve is opened. In this manner, the pressure is decreased at the front wheel brake, which means that the brakes are disengaged if after the lapse of a predetermined time delay as determined by the timing element Z, no reacceleration signal (+b) is present in its input.

The negative acceleration signals (−b) are, as mentioned above, processed in a conventional manner in logic circuit connections of the remaining brake force control system. Since the valves E and O as well as the apparatus for processing the negative acceleration signals (−b) are of the type as disclosed, for example, in said pending applications, the dash lines are used to indicate this fact. Of course, in actual practice suitable isolation means and gate circuits will be used to obtain the override effect of the output signals from the timer element Z over any other signals of the brake control system which would otherwise cause an opposite control effect, i.e., which would seek to open the inlet valve and close the outlet valve. Furthermore, if analog signals are present in the output of a differentiator, as would be the case normally, then suitable weighting threshold circuits of conventional design must be included in the separator or timing elements. Hence, it may be desirable to connect the signal separator T and timer element Z at a point in the control system where a digital signal is already present, such as in the outputs of the differential amplifiers $DV_{32}$, $DV_{33}$ and $DV_{42}$, $DV_{43}$ in order to dispense with the need of additional weighting devices.

Thus, the present invention resides in the use of the signal separator T and the control circuit consisting of the timer element Z combined with a negation element which are connected to the inlet and outlet valves E and O. For the sake of simplicity, the control circuits used for processing the negative acceleration signals (−b) are merely schematically indicated by connections shown within the lower dash-line block. Of course, in the actual system, two channels of the type indicated in FIG. 2 may be provided, one each for the rear wheels. The outputs of the two signal separators T used under those circumstances can then be combined by means of conventional logic elements to cause the closing of the inlet valves E and the opening of the outlet valves O of both front wheel brakes only if no positive acceleration signal (+b) appears in both channels associated with the rear wheels. However, as mentioned above, it is also possible by suitably combining the outputs associated with the two rear wheel channels to actuate the inlet valves E and the outlet valves O of both front wheels if no reacceleration signal (+b) occurs in either of the two channels associated with the rear wheels. Since this can be done by conventional logic circuits, known as such to a person skilled in the art, a detailed description thereof is dispensed with herein for the sake of simplicity.

Figure 3:
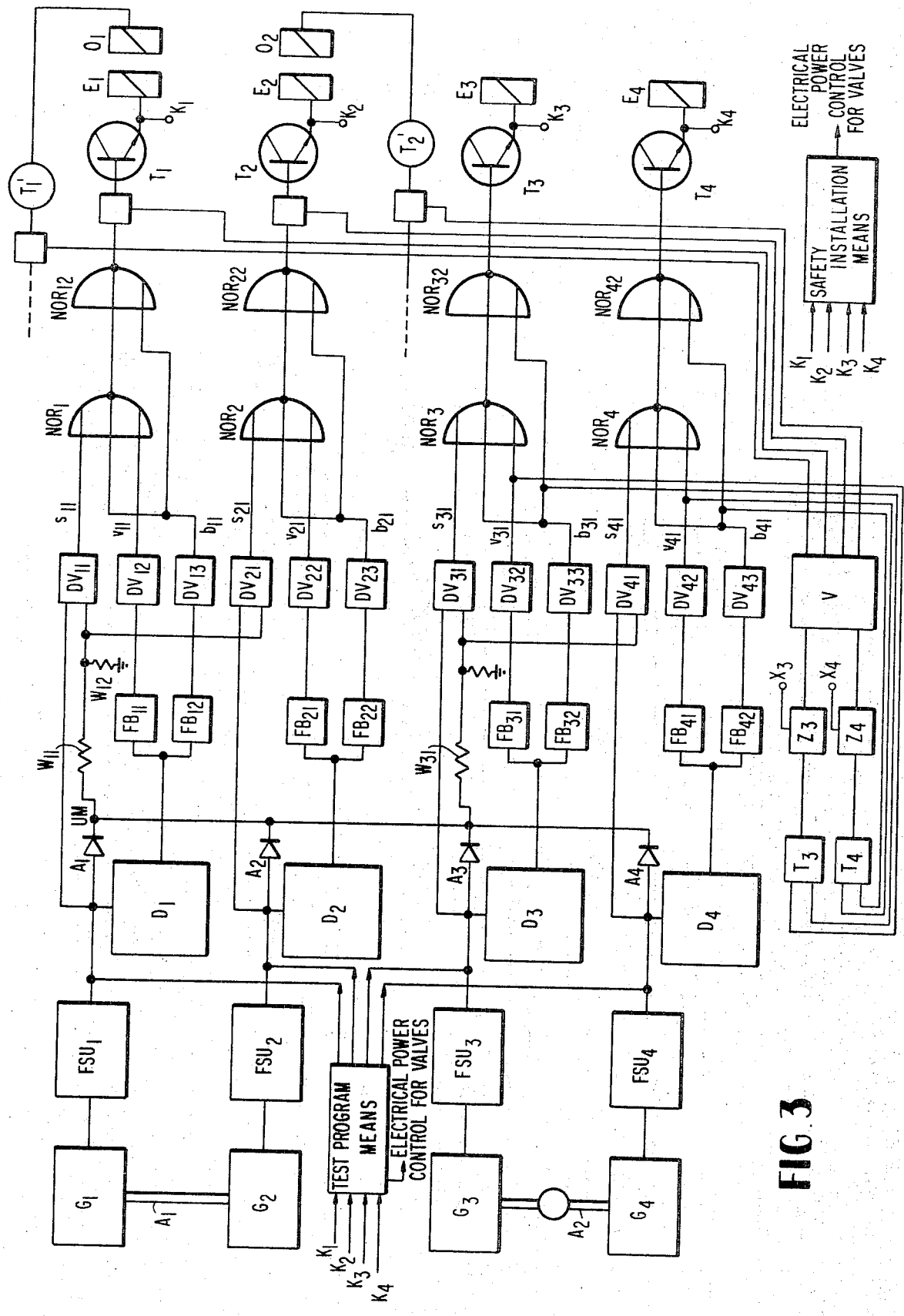
FIG. 3 is a schematic block diagram illustrating a control system as disclosed in said prior applications which is modified to incorporate the anti-tilt control in accordance with the present invention.

Referring now to FIG. 3, this figure shows a brake force control system as disclosed in said copending applications, modified to incorporate therein the antitilting control in accordance with the present invention. In FIG. 3, one frequency generator $G_1$ to $B_4$ is coordinated to a respective one of the four wheels. These generators are multi-pole a.c. generators with a large number of poles in which the frequency represents rotational speed information. The pulses derived from the transmitters $G_1$ and $G_4$ are applied to conventional frequency-voltage converters $FSU_1$ to $FSU_4$. The rotational speed signals available at the outputs of the latter are connected by way of diodes $A_1$ to $A_4$ to a common point UM for producing a maximum reference voltage. This reference voltage at point UM is therefore determined by the wheel rotating fastest. This maximum reference voltage forms the comparison voltage for the slippage of each wheel. It is divided in the desired response rotational speed ratio by resistances $W_{11}/W_{12}$ and resistances $W_{31}/W_{32}$ and is fed to the input of the differential amplifiers $DV_{11}$, $DV_{21}$, $DV_{31}$ and $DV_{41}$. The response condition can be selected differently for each axle in order to take into consideration the differences in the axle load distribution.

Additionally, the rotational speed signal is fed in by-passing relationship to the aforementioned diodes and the maximum voltage point UM, to the second input of a respective differential amplifier $DV_{11}$ to $DV_{41}$. These differential amplifiers of any conventional construction serve as comparators and are constructed as threshold circuits of conventional type. One obtains in the output of such a differential amplifier a signal when the respective wheel has reached a slippage value with respect to the wheel rotating fastest (comparison standard), that is defined by the resistance ratio $W_{11}/W_{12}$ and $W_{31}/W_{32}$, respectively. This signal in the output of the differential amplifier is a logical yes/no signal. Insofar as the outlet valves (not shown) are to be controlled separately, the same installation with another threshold value is present once more.

The acceleration of the wheel can be obtained from the rotational speed proportional voltage in the output of the frequency voltage converter by an electrical differentiation. For this purpose, the frequency voltage converters $FSU_1$ to $FSU_4$ are connected with the differentiators $D_1$ to $D_4$ of conventional construction in by-passing relationship to the maximum voltage point UM. The signal available in the output thereof, however, is not yet suitable for further transmission since high frequency rotational speed changes are present not only during the brake slippage. However, they should not be used for the signal transmission. Consequently, a frequency valuation or weighting has to be introduced in such a manner that:

1. The high frequency component in the acceleration operation is of little influence on the control system; and 2. Only a predetermined acceleration progress permits a signal preparation.

For this purpose, the differentiators $D_1$ to $D_4$ are connected with two frequency weighting elements $FB_{11}$ and $FB_{12}$, $FB_{21}$ and $FB_{22}$, $FB_{31}$ and $FB_{32}$ and $FB_{41}$ and $FB_{42}$, respectively, which are of any conventional construction. These elements $FB_{11}$ to $FB_{41}$ serve the weighting of the deceleration and the elements $FB_{12}$ to $FB_{42}$ the weighting of the acceleration. In order that these weighting operations can be realized from differing points of view, the weighting elements are constructed differently. The outputs of these frequency valuation or weighting elements $FB_{11}$ or $FB_{12}$ to $FB_{41}$ and $FB_{42}$ are connected with corresponding differential amplifiers $DV_{12}$ and $DV_{13}$ to $DV_{42}$ and $DV_{43}$, respectively. In the output of each differential amplifier $DV_{12}$ to $DV_{42}$ serving as threshold circuits is provided a logical yes/no signal for the deceleration, and in the output of each differential amplifier $DV_{13}$ to $DV_{43}$ a logical yes/no signal for the acceleration.

Thus, three logic signals are available for the control of the adjustingor actuating members, for example, of the inlet valves $E_1$ to $E_4$; namely, the slippage $s_{11}$ to $s_{41}$, the deceleration $v_{11}$ to $v_{41}$ and the accelerations $b_{11}$ and $b_{41}$. These signals are now combined by a logic circuit. This logic circuit itself is constituted of conventional logical elements which fulfill the requisite functions. In the instant case, a NOR-element $NOR_1$ to $NOR_4$ with three inputs and a NOR-element $NOR_{12}$ to $NOR_{42}$ with two inputs each are provided. The differential amplifiers $DV_{11}$, $DV_{12}$ and $DV_{13}$ are thereby connected with the three inputs of the NOR-element $NOR_1$ whose output is connected with one input of the NOR-element $NOR_{12}$. Additionally, a connection leads from the differential amplifier $DV_{13}$ to the second input of the NOR-element $NOR_{12}$.

In operation if a wheel is braked, then as described in said copending applications, its deceleration $v$ increases and exceeds at a certain first point the threshold of the inlet valve so that the latter closes. A further pressure build-up in the brake circuit is thus prevented. Nevertheless, the wheel continues to decelerate so that the deceleration further increases and exceeds or surpasses in a second point the response threshold of the outlet valve. The latter is now also controlled and opens, i.e., the pressure in the brake circuit is decreased. In the meantime, also the slippage has exceeded the response threshold of the valves, however, this remains without influence since the valves have already been controlled.

After the opening of the outlet valve, the wheel is again accelerated by the road, i.e., its rotational speed again increases. A rotary acceleration thereby occurs at the wheel, and this rotational speed acceleration now exceeds in a third point the response threshold of the output valve, i.e., the latter is closed again. A further pressure decrease in the wheel brake is prevented thereby. The wheel naturally continues to accelerate so that in a fourth point, also the response threshold of the inlet valve is exceeded so that the latter opens. As a result thereof pressure is again built up in the brake circuit and the braking starts again. The wheel is now again braked and the wheel acceleration again passes over into a wheel deceleration. Consequently, the response threshold of the inlet valve is again passed in a fifth point, i.e., the inlet valve closes and the pressure remains constant for such length of time until the slippage in a sixth point drops below the response threshold of the inlet valve and opens the same again.

The subsequent control cycle takes place in principle exactly as the first. The associated slippage thresholds are thereby reached always later in time than the acceleration thresholds so that the slippage has an influence during this phase only during the re-opening of the inlet valve. If, however, one considers now the third control cycle, then one determines that during the reacceleration, the response thresholds of the valves are not reached at all by the acceleration. This means the brake is not released again for operation by the acceleration signals. The wheel therefore continues to accelerate as before and the slippage decreases. Consequently, the slippage value then surpasses the response thresholds of the two valves and will therefore assume the control. The brakes are therefore ready again for further control cycles.

A safety installation is coordinated to the brake force control system. It has the task to supervise and monitor the functioning and proper operation of the control. In case of a disturbance—also of the safety installation itself—the control is to be disconnected in such a manner that the vehicle brakes are ready to function in their normal manner. This safety installation is also constructed as an electrical logic circuit. The control signals of the valves which, in the embodiment according to FIG. 3, are present at the points $K_1$ to $K_4$ (or analogously those also of the non-illustrated outlet valves), may be utilized for the supervising of the installation. If all sensing devices and the control apparatus are in order, then none of the points $K_1$ to $K_4$ carries a potential. If a control takes place during a braked drive, then the valves are controlled. Corresponding to the frequency of the control cycles, this control is of short duration. If a continuous potential is present at any one of the points $K_1$ to $K_4$, then this indicates an error or failure in the installation. This criterion is utilized by the safety logic circuit for disconnecting the installation, for example, for turning off the current supplied to the magnetic valves.

A disconnection of the installation after the beginning of a braking operation can lead to critical driving conditions. Consequently, a monitoring and supervision is necessary already during the unbraked drive. Since the installation operates independently of the actuation of the brakes, a continuous monitoring and supervision can be carried out according to the principle described above.

It can be prevented by suitable measures that the safety installation also responds to an excessive drive slippage of one or several driving wheels. For example, the simultaneous presence of a potential at the valves of the non-driven wheels with non-actuated brake may be utilized as logical decision.

A further monitoring possibility resides in that the control device is continuously acted upon with a test program with non-actuated brakes.

The test program simulates alternately for the individual wheels a rotational speed change and utilizes the response of the control system, for example, the potentials at $K_1$ to $K_4$.

The device of FIG. 3 so far described and its operation correspond to those of said co-pending application Ser. No. 52,833, now U.S. Pat. No. 3,744,851, and said German application P 19 37 123.4-21 which is not altered in its basic functioning by the anti-tilt control of this invention. If it is assumed that the vehicle is a conventional motor vehicle with driven rear axles, and that the axle $A_2$ represents the rear axle, then the generators $G_3$ and $G_4$ will, as before, produce pulses indicative of the rotational speed conditions of the rear wheels. According to the present invention, a separator circuit $T_3$ and $T_4$ each is connected in the output of the differential amplifiers $DV_{32}$, $DV_{33}$ and $DV_{43}$, $DV_{43}$, respectively. As mentioned above, the acceleration signals $b_{31}$ and $b_{41}$ are present in the outputs of the differential amplifiers $DV_{33}$ and $DV_{43}$ while the acceleration signals $v_{31}$ and $v_{41}$ are present in the outputs of the differential amplifiers $DV_{32}$ and $DV_{42}$. The separators $T_3$ and $T_4$ which are connected to the outputs of the differential amplifiers $DV_{33}$ and $DV_{43}$ are thereby operable to separate out the signals of one polarity from the signals of both polarities present in the outputs of these differential amplifiers $DV_{33}$ and $DV_{43}$, for example, the positive signals $(+b)$ for further processing in the timer elements $Z_3$ and $Z_4$. The acceleration signals of the other polarity, for example, the signals of negative polarity $(-b)$ are applied as before for use in the control of the NOR-circuits $NOR_3$, $NOR_{32}$ and $NOR_4$, $NOR_{42}$, respectively. The reason the separators $T_3$ and $T_4$ are also connected to the outputs of the differential amplifiers $DV_{32}$ and $DV_{42}$ is the fact that for purposes of selecting the signal in the separator $T_3$ or $T_4$, it is necessary that the signal $(-b)$ had been present beforehand.

The positive signals $(+b)$ obtained in the outputs of the separators $T_3$ and $T_4$, which as mentioned above are of conventional construction and utilizing known circuits, are applied to a respective timer element $Z_3$ and $Z_4$ which are also of conventional construction and are combined with a negation circuit as described above. The timer elements $Z_3$ and $Z_4$ and the negation circuits connected thereto are also of conventional construction utilizing well known circuits. Separate timing and negation elements may be associated to each of the channels coordinated to the two rear wheels or they can also be suitably combined in a conventional manner so that a signal is produced in the output thereof only if no acceleration signal appears from either or both rear wheels after the lapse of the predetermined time delay $W_1$ or $W_2$, depending on the type of circuit used. The pressure decrease signal obtained by conventional means which starts the timer element or elements $Z_3$ and $Z_4$ to run, is thereby applied thereto, for example, to terminals $X_3$ and $X_4$. In operation, if no reacceleration signal $(+b)$ is present in the output of the separator elements $T_3$ and $T_4$ at the end of the predetermined time delay, then a pulse is produced in the output of the timing elements $Z_3$ and $Z_4$ which after, for example, suitable amplification and/or other modifications such as inversion, etc., in the element V is then applied by way of suitable gate circuits of conventional design to the input of the amplifiers $T_1$ and $T_2$ actuating the inlet valves $E_1$ and $E_2$ so as to close the inlet valves and to the input of the amplifiers $T_1'$ and $T_2'$ actuating the outlet valves $O_1$ and $O_2$ so as to open the same. The outlet valves $O_1$ and $O_2$ are thereby controlled in a manner similar to the inlet valves $E_1$ and $E_2$ by the use of analogous logic elements including NOR circuits as shown in detail in connection with each channel for the inlet valves $E_1$ and $E_2$.

To obtain the desired override effect for the signals from the timer negation elements, a conventional "AND" gate may be used having a "NOT" input for the signals from the timer-negation elements. Additionally, conventional isolation means in the form of rectifiers may be included in the element V to prevent an interaction of the respective circuits. Furthermore, in lieu of inserting the separator elements $T_3$ and $T_4$ as shown in FIG. 3, it is also possible to interconnect the same at any other appropriate place in each channel, for example, between elements $FB_{32}$ and $DV_{33}$ and between elements $FB_{42}$ and $DV_{43}$, taken into consideration what was stated in connection with FIG. 2.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. A brake force control system for vehicles with front and rear wheel brakes controlled by valve means, especially for motor vehicles, which includes means coordinated to each wheel for detecting the rotational condition of the wheel and operable to produce signals representative of such conditions, inlet and outlet valve means, and connecting means including logic circuit means for actuating said valve means in response to the signals of the detecting meansexceeding or dropping below certain threshold values so means exceeding the brake pressure either increases, remains constant or decreases, characterized in that the connecting means includes additional logic circuit means operatively connected between the detecting means and the valve means which include means for decreasing the pressure at the front wheel brakes if a signal symbolizing the road adherence of the rear wheels does not arrive within a predetermined delay.

2. A brake force control system according to claim 1, characterized in that control system is used in vehicles with high center of gravity and short wheel base. beginning after 3. A brake force control system according to claim 1, wherein the control system provides a pure acceleration control or combined acceleration-slippage control, characterized in that the additional logic circuit connection means includes means for decreasing the pressure at the front wheel brakes if not reacceleration signal occurs at the rear wheels after a delay of about 200–300 ms. —beginningafter the expiration of the filtering time following a pressure decrease signal at the rear wheels.

4. A brake force control system according to claim 1, wherein the control system provides a pure slippage control or a pure slippage guidance of the rear wheels, characterized in that the additional logic circuit means includes means for decreasing the pressure at the front wheel brakes if after a delay of about 100 to 200 ms. —beginning with the pressure decrease signal when exceeding the upper slippage threshold of the rear wheels—a dropping below a slippage threshold is not signalled at the rear wheels.

5. A brake force control system according to claim 1, characterized in that the logic circuit means include means for blocking the pressure increase signals for the front wheels in the presence of a pressure decrease signal at the rear wheels and for permitting the passage of only pressure decrease signals for the front wheels.

6. A brake force control system, according to claim 5, characterized in that the additional logic circuit means includes means responsive only to the signals of one rear wheel.

7. A brake force control system according to claim 5, characterized in that the additional logic circuit means responsive only to the signals of both rear wheels.

8. A brake force control system according to claim 5, characterized by means for realizing the pressure decrease at the front wheel brakes intermittently.

9. A brake force control system, according to claim 1, characterized in that the additional logic circuit means includes means responsive only to the signals of one rear wheel.

10. A brake force control system according to claim 1, characterized in that the additional logic circuit includes means responsive only to the signals of both rear wheels.

11. A brake force control system according to claim 1, characterized by means for realizing the pressure decrease at the front wheel brakes intermittently.

12. A brake force control system for the brakes of vehicles equipped with control valve means, in which a sensing means coordinated to each wheel for determining its rotational condition, influences the brakes when a predetermined threshold value is exceeded or dropped below, each sensing means includes means responsive to the speed of the wheel for providing measuring magnitudes in the form of first, second and third signals representing wheel slippage, acceleration and deceleration, respectively, threshold circuit means for each of these signals for providing an output signal indicative of whether the threshold value has been exceeded or not, means for combining the output signals of said threshold circuit means to provide an output signal which serves as a control signal for the value means of the brakes, and additional means operatively connected between said sensing means and the valve means for producing control signals overriding said first-mentioned control signal to decrease the pressure at the front wheel brakes if a signal indicative of road traction at the rear wheels does not arrive within a predetermined delay.

13. A brake force control system according to claim 12, characterized in that the measuring magnitude which is proportional to the rotational speed and is derived from the corresponding sensing means, serves, on the one hand, for the formation of the measuring magnitude representing the slippage by a comparison with a comparison standard representing the speed of the fastest wheel and, on the other, for the formation of the measuring magnitude representing the acceleration by differentiation.

14. A brake force control system according to claim 13, characterized by comparison means operatively connected to said sensing means for producing the measuring magntidue representing the slippage and differentiating means operatively connected with the corresponding sensing means for forming the measuring magnitude representing the acceleration.

15. A brake force control system according to claim 13, characterized in that a frequency generator means is drivingly connected with each wheel as sensing means.

16. A brake force control system according to claim 15, characterized in that the frequency generator means is arranged at a respective wheel.

17. A brake force control system according to claim 15, characterized in that a frequency voltage converter means is operatively connected with each frequency generator means, the output from said frequency voltage converter means being connected together by way of diodes to a point for forming the maximum voltage representing the speed of the fastest wheel, while the outputs of said frequency voltage converter means are also operatively connected with differentiator means in by-passing relationship to the maximum voltage point.

18. A brake force control system according to claim 17, characterized in that the maximum voltage prevailing at the maximum voltage point is subdivided at the ratio of the desired response condition by resistance means and a partial voltage is fed to a differential amplifier means constructed as threshold circuit means.

19. A brake force control system according to claim 12, characterized in that a frequency voltage converter means is operatively connected with each frequency generator means drivingly connected with each wheel as sensing means, the outputs from said frequency voltage converter means being connected together by way of diodes to a point for forming the maximum voltage representing the speed of the fastest wheel, while the outputs of said frequency voltage converter means are also operatively connected with differentiator means in by-passing relationship to the maximum voltage point.

20. A brake force control system according to claim 19, characterized in that the maximum voltage prevailing at the maximum voltage point is subdivided at the ratio of the desired response condition by resistance means and a partial voltage is fed to a differential amplifier means constructed as threshold circuit means.

21. A brake force control system according to claim 12, characterized by a safety installation for continuously monitoring and supervising the control system which prevents a transmission of signals to an adjusting valve means in case of erroneous signals.

22. A brake force control system according to claim 21, characterized in that the adjusting valve means for valves of the brakes are so actuated in case of erroneous signals that the brakes operate in the normal manner.

23. A brake force control system according to claim 21, characterized in that the safety installation includes an electric logic circuit means operatively connected between an output transistor and its corresponding adjusting means which de-energizes the adjusting valve means in case of response of its circuit.

24. A brake force control system according to claim 23, characterized in that the test program means are provided for applying signals to the control system with non-actuated brakes for producing output control signals by the simulated rotational speed changes thereof which are continuously monitored by the safety installation.

25. A brake force control system for the brakes of vehicles equipped with control valve means, in which a sensing means coordinated to each wheel for determining its rotational condition influences the brakes when a predetermined threshold value is exceeded or dropped below, each sensing means includes means responsive to the speed of the wheel for providing measuring magnitudes in the form of first, second and third signals representing wheel slippage, acceleration and deceleration, respectively, threshold circuit means for each of these signals for providing an output signal indicative of whether the threshold value has been exceeded or dropped below, each sensing means includes means responsive to the speed of the wheel for providing measuring magnitudes in the form of first, second and third signals representing wheel slippage, acceleration and deceleration, respectively, threshold circuit means for each of these signals for providing an output signal indicative of whether the threshold value has been exceeded or not, means for combining the output signals of said threshold circuit means to provide an output signal which serves as a control signal for the valve means of the brakes, and additional means operatively connected between said sensing means and the valve means for producing control signals overriding said first-mentioned control signal to decrease the pressure at the front wheel brakes if a signal indicative of road traction at the rear wheels does not arrive within a predetermined delay, in that the measuring magnitude which is proportional to the rotational speed and is derived serves, on the one hand, for the formation of the measuring magnitude representing the slippage by a comparison with a comparison standard representing the speed of the fastest wheel and, on the other, for the formation of the measuring magnitude representing the acceleration by differentiation, in that a frequency generator means is drivingly connected with each wheel as sensing means, in that a frequency voltage converter means is operatively connected with each frequency generator means, the outputs from said frequency voltage converter means being connected together by way of diodes to a point for forming the maximum voltage representing the speed of the fastest wheel, while the outputs of said frequency voltage converter means are also operatively connected with differentiator means in by-passing relationship to the maximum voltage point, in that the maximum voltage prevailing at the maximum voltage point is subdivided at the ratio of the desired response condition by resistance means and a partial voltage is fed to a differential amplifier means constructed as threshold circuit means, and in that each differentiator means is connected with its output to two parallel frequency weighting means which, in their turn, are each operatively connected with a respective differential amplifier means constructed as threshold circuit means.

26. A brake force control system according to claim 25, characterized in that the frequency weighting means for deceleration and acceleration are different.

27. A brake force control system according to claim 26, characterized in that one threshold circuit means each for slippage, for acceleration and for deceleration is operatively associated with each adjusting valve means present in a respective brake circuit, the output signals of the three threshold circuit means being interconnected by combining means in the form of a logic circuit means according to a predetermined logic arrangement.

28. A brake force control system according to claim 27, characterized in that the threshold circuit means are differential amplifier means for the slippage, for the acceleration and for the deceleration.

29. A brake force control system according to claim 27, characterized in that the logic circuit means includes integrated circuits with a NOR-element having three inputs and a NOR-element having two inputs for each adjusting means.

30. A brake force control system according to claim 29, characterized in that the output of each threshold circuit means is connected with one input of the NOR-element having three inputs whose output is connected with one input of the NOR-element having two inputs while the second input of the NOR-element having two inputs is operatively connected with the differential amplifier means of the threshold circuit means representing the acceleration.

31. A brake force control system according to claim 30, characterized by a safety installation for continuously monitoring and supervising the control system which prevents a transmission of signals to the adjusting valve means in case of erroneous signals.

32. A brake force control system according to claim 31, characterized in that the adjusting valve means for the valves of the brakes are so actuated in case of erroneous signals that the brakes operate in the normal manner.

33. A brake force control system according to claim 32, characterized in that the safety installation includes an electric logic circuit means operatively connected between an output transistor and its corresponding adjusting valve means which de-energizes the adjusting valve means in case of response of its circuit.

34. A brake force control system according to claim 33, characterized in that the adjusting valve means are solenoid valves which are de-energized.

35. A brake force control system according to claim 33, characterized in that test program means are provided for applying signals to the control system with non-actuated brakes for producing output control signals by the simulated rotational speed changes thereof which are continuously monitored by the safety installation.

36. A brake force control system for the brakes of vehicles equipped with control valve means, in which a sensing means coordinated to each sheel for determining its rotational condition influences the brakes when a predetermined threshold value is exceeded or dropped below, each sensing means includes means responsive to the speed of the wheel for providing measuring magnitudes in the form of first, second and third signals representing wheel slippage, acceleration and deceleration, respectively, threshold circuit means for each of these signals for providing an output signal indicative of whether the threshold value has been exceeded or not, means for combining the output signals of said threshold circuit means to provide an output signal which serves as a control signal for the valve means of the brakes, and additional means operatively connected between said sensing means and the valve means for producing control signals overriding said first-mentioned control signal to decrease the pressure at the front wheel brakes if a signal indicative of road traction at the rear wheels does not arrive within a predetermined delay, in that a frequency voltage converter means is operatively connected with each frequency generator means drivingly connected with each wheel as sensing means, the outputs from said frequency voltage converter means being connected together by way of diodes to a point for forming the maximum voltage representing the speed of the fastest wheel, while the outputs of said frequency voltage converter means are also operatively connected with differentiator means in by-passing relationship to the maximum voltage point, in that the maximum voltage prevailing at the maximum voltage point is subdivided at the ratio of the desired response condition by resistance means and a partial voltage is fed to a differential amplifier means constructed as threshold circuit means, and in that each diffrtiator means is connected with its output to two parallel frequency weighting means which, in their turn, are each operatively connected with a respective differential amplifier means constructed as threshold circuit means.

37. A brake force control system according to claim 36, characterized in that the frequency weighting means for deceleration and acceleration are different.

38. A brake force control system for vechicles with front and rear wheels according to claim 36, characterized in that said additional means includes separator means operable to separate out signals according to the polarity thereof and timer means operable to produce an output signal in the absence of an input signal within a predetermined delay from the time each timer means starts to run, said separator means and timer means having input and output means, the input means of the separator means being operatively connected to the outputs of the differential amplifier means associated with the rear wheels, the output means of the separator means being operatively connected to the input means of the timer means, and means operatively connecting the outupt means of the timer means to the control valve means of the front wheels to decrease the braking pressure at the front wheels in the absence of a signal, symbolizing road adherence of the rear wheels, at the input means of the timer means within said predetermined delay.

39. A brake force control system for the brakes of vehicles equipped with control valve means, in which a sensing means coordinated to each wheel for determining its rotational condition influences the brakes when a predetermined threshold value is exceeded or dropped below each sensing means includes means responsive to the speed of the wheel for providing measuring magnitudes in the form of first, second and third signals representing wheel slippage, acceleration and deceleration, respectively, threshold circuit means for each of these signals for providing an output signal indicative of whether the threshold value has been exceeded or not, means for combining the output signals of said threshold circuit means to provide an output signal which serves as a control signal for the valve means of the brakes, and additional means operatively connected between said sensing means and the valve means for producing control signals overriding said first-mentioned control signal to decrease the pressure at the front wheel brakes if a signal indicative of road traction at the rear wheels does not arrive within a predetermined delay, and in that one threshold circuit means each for slippage, for acceleration and for deceleration is operatively associated with each adjusting valve means present in a respective brake circuit, the output signals of the three threshold circuit means being interconnected by combining means in the form of a logic circuit means according to a predetermined logic arrangement.

40. A brake force control system according to claim 39, characterized in that the threshold circuit means are differential amplifier means for the slippage, for the acceleration and for the deceleration.

41. A brake force control system according to claim 39, characterized in that the logic circuit means includes integrated circuits with a NOR-element having three inputs and a NOR-element having two inputs for each adjusting means.

42. A brake force control system according to claim 41, characterized in that the output of each threshold circuit means in connected with one input of the NOR-element having three inputs whose output is connected with one input of the NOR-element having two inputs while the second input of the NOR-element having two inputs is operatively connected with the differential amplifier means of the threshold circuit means representing the acceleration.

43. A brake force control system for vehicles with front and rear wheel brakes controlled by valve means, especially for motor vehicles, the control system including sensing means coordinated to at least one wheel of each of a front and rear axle for detecting the rotational condition of the wheel and for producing signals representative of the rotational condition, inlet and outlet valve means, and connecting means including logic circuit means for actuating the valve means in response to the signals of the sensing means exceeding or dropping below predetermined threshold values so that the brake pressure either increases, remains constant or decreases, characterized in that the connecting means includes additonal logic circuit means for preventing excessive forward pitching of the vehicle, the additional logic circuit means being operatively connected between the sensing means and the valve means and including decreasing pressure means responsive to the absence of a signal indicative of the road adherence of the rear wheels within a predetermined period of time for controlling the valve means for the front wheel brakes to decrease the pressure thereat so as to prevent excessive forward pitching of the vehicle.

44. A brake force control system according to claim 43, characterized in that the pressure decreasing means only decreases the pressure at the front wheel brakes.

\* \* \* \* \*